US009114521B2

(12) United States Patent
Yoshikawa

(10) Patent No.: US 9,114,521 B2
(45) Date of Patent: Aug. 25, 2015

(54) ELECTRIC POWER TOOL

(75) Inventor: Shuji Yoshikawa, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 931 days.

(21) Appl. No.: 13/376,088

(22) PCT Filed: Mar. 29, 2010

(86) PCT No.: PCT/JP2010/055529

§ 371 (c)(1),
(2), (4) Date: Dec. 15, 2011

(87) PCT Pub. No.: WO2010/140422

PCT Pub. Date: Dec. 9, 2010

(65) Prior Publication Data

US 2012/0080963 A1 Apr. 5, 2012

(30) Foreign Application Priority Data

Jun. 4, 2009 (JP) ................................ 2009-135023

(51) Int. Cl.
*H02K 7/14* (2006.01)
*B25F 5/02* (2006.01)

(52) U.S. Cl.
CPC ........................................ *B25F 5/02* (2013.01)

(58) Field of Classification Search
None
See application file for complete search history.

(56) References Cited

U.S. PATENT DOCUMENTS

| | | | | |
|---|---|---|---|---|
| 3,121,813 | A * | 2/1964 | Pratt et al. | 310/50 |
| 3,818,255 | A * | 6/1974 | Wagner | 310/50 |
| 3,908,139 | A * | 9/1975 | Duncan, Jr. | 310/50 |
| 4,223,744 | A * | 9/1980 | Lovingood | 173/48 |
| 4,730,134 | A * | 3/1988 | Sistare | 310/50 |
| 4,908,538 | A * | 3/1990 | Geberth, Jr. | 310/59 |
| 4,955,128 | A * | 9/1990 | Sogabe et al. | 29/596 |
| 5,073,736 | A * | 12/1991 | Gschwender et al. | 310/88 |
| 5,361,853 | A * | 11/1994 | Takamura et al. | 173/217 |
| 6,553,642 | B2 * | 4/2003 | Driessen | 29/453 |
| 7,462,964 | B2 * | 12/2008 | Nagayama et al. | 310/58 |
| 2001/0017498 | A1 * | 8/2001 | Matsuoka et al. | 310/90 |

FOREIGN PATENT DOCUMENTS

| | | |
|---|---|---|
| CN | 201180676 Y | 1/2009 |
| JP | U-60-078253 | 5/1985 |
| JP | A-2000-042948 | 2/2000 |

(Continued)

OTHER PUBLICATIONS

International Search Report issued in Application No. PCT/JP2010/055529; Dated Apr. 27, 2010 (With Translation).

Japanese Office Action issued in Application No. 2009-135023; Dated Apr. 23, 2013 (With Translation).

(Continued)

*Primary Examiner* — Tran Nguyen
(74) *Attorney, Agent, or Firm* — Oliff PLC

(57) ABSTRACT

An electric power tool of the present invention includes a motor used as a drive source housed in a dual-separated type housing and includes a bearing support member that covers the outer circumferential surface of a bearing of the motor and supports the bearing from outside in the radial direction, and is configured such that the bearing and one end of the bearing support member in the axial direction are inserted in a tool component disposed coaxially, and a protruding portion that is the other end of the bearing support member and axially protrudes from the tool component is supported by receiving portions of a pair of housing parts.

4 Claims, 7 Drawing Sheets

(56) References Cited

FOREIGN PATENT DOCUMENTS

| | | |
|---|---|---|
| JP | A-2003-181778 | 7/2003 |
| JP | A-2006-333587 | 12/2006 |
| JP | A-2007-295773 | 11/2007 |

OTHER PUBLICATIONS

Chinese Office Action and Search Report issued in Chinese Patent Application No. 201080024450.4 on Mar. 20, 2014 (with translation).

* cited by examiner

ELECTRIC POWER TOOL

BACKGROUND OF THE INVENTION

Field of the Invention

The present invention relates to an electric power tool configured such that a motor used as a drive source is housed in a dual-separated type housing of the electric power tool.

Description of the Related Art

An existing electric power tool relating to the present invention is disclosed in Japanese Laid-Open Patent Publication No. 2007-295773.

The electric power tool disclosed in Japanese Laid-Open Patent Publication No. 2007-295773 is an impact driver and includes a dual-separated type housing, as shown in FIG. 5.

The housing includes a substantially cylindrical housing body and a grip configured to protrude downward from the housing body. Further, a motor used as a drive source of the impact driver is housed at the rear portion of the housing body. As shown in FIG. 9, the motor includes a stator 105 and a rotator 107, and a rotary shaft 108 of the rotator 107 is supported by a front bearing 109*f* and a rear bearing 109*b*. Further, a disk-shaped fan 106 is fixed on the rotary shaft 108 between the rotator 107 and the rear bearing 109*b*. The rear bearing 109*b* is configured to be supported from outside in the radial direction by a receiving portion (not shown) of the dual-separated housing.

SUMMARY OF THE INVENTION

Problems to be Solved by the Invention

In the electric power tool described above, the rear bearing 109*b* is configured to be supported from outside in the radial direction by the receiving portion of the dual-separated type housing. Therefore, in order to support the rear bearing 109*b* entirely by means of the receiving portion of the housing, it is necessary that the outer circumferential surface of the rear bearing 109*b* protrude completely from the fan 106. Accordingly, the length of the electric power tool increases by an amount equal to that of the rear bearing 109*b* protruded.

Further, in order to decrease the length of the electric power tool as much as possible, it may be possible to dispose a part of the rear bearing 109*b* inside the fan 106. However, in this configuration, since only the remaining part of the rear bearing 109*h* that protrudes rearward from the fan 106 can be used to support by means of the receiving portion of the housing, there is a problem in that support strength of the rear bearing 109*b* decreases.

Further, the problem is solved when the housing is formed in a cylindrical shape, but the handle portion becomes a separate part and the number of parts of the housing increases, which results in an increase of the cost.

There is a need in the art to decrease the entire length of an electric power tool by preventing a decrease in support strength of a bearing, even if a part of the bearing of a motor is disposed inside a component (for example, a fan) of the electric power tool that includes a dual-separated type housing.

SUMMARY OF THE INVENTION

A first aspect of the present invention provides an electric power tool configured such that a motor used as a drive source is housed in a dual-separated type housing and includes a bearing support member that covers the outer circumferential surface of a bearing of the motor and supports the bearing from outside in the radial direction, in which the bearing and one end of the bearing support member in the axial direction are at least partially inserted in a tool component that is coaxially disposed, and a protruding portion that is the other end of the bearing support member which axially protrudes from the tool component is supported by receiving portions of a pair of housing parts.

According to the first aspect of the present invention, the bearing and one end of the bearing support member of the motor in the axial direction are at least partially inserted in the tool component that is coaxially disposed. That is, the bearing of the motor and the tool component partially and axially (in the horizontal direction of the tool) overlaps with each other. Therefore, as compared with the configuration of the related art in which the bearing of the motor protrudes completely from the tool component and is supported by the receiving portions of parts of the left and right housing, it is possible to decrease the length of the electric power tool by an amount equal to the overlapping area of the bearing of the motor and the tool component.

Further, the bearing of the motor is supported from outside in the radial direction by the bearing support member, with the outer circumferential surface of the bearing entirely covered by the bearing support member. Further, the protruding part of the bearing support member that protrudes axially from the tool component is configured to be supported from outside in the radial direction by the receiving portions of the pair of the housing parts. As described above, since the bearing is supported entirely by the bearing support member even though the bearing of the motor and the tool component partially overlap each other, support strength of the bearing of the motor is not decreased.

According to a second aspect of the present invention, the axial length of the protruding part of the bearing support member is smaller than that of the bearing of the motor.

That is, it is possible to decrease the length of the electric power tool in comparison to the related art by an amount equal to the difference between the length of the protruding portion of the bearing support member and the length of the bearing of the motor.

According to another aspect of the present invention, a baffle for the housing is formed at the protruding part of the bearing support member.

Therefore, it is possible to prevent rotation of the bearing support member with respect to the housing.

According to another aspect of the present invention, the tool component is a fan fixed on a rotary shaft of the motor, a fixing iron core of the motor, or an insulator covering teeth of the fixing iron core.

Another aspect of the present invention provides an electric power tool configured such that a motor used as a drive source is housed in a dual-separated type housing and includes a bearing support member that covers the outer circumferential surface of a bearing of the motor and supports the bearing from outside in the radial direction, in which the bearing support member is disposed between a fan fixed on a rotary shaft of the motor and a fixing iron core of the motor, and the outer circumferential edge of the bearing support member is supported by receiving portions of a pair of housing parts.

According to another aspect of the present invention, the bearing support member has an opening at the center portion thereof and brings a wind, which is generated by the fan when the motor rotates, into the center.

That is, the bearing support member can be configured by a baffle plate that brings a wind generated by the fan into the center, and it is not necessary to provide a separate member that only serves to support the bearing of the motor.

According to the present invention, it is possible to decrease the entire length of the electric power tool as much as possible without decreasing the support strength of the bearing of the motor.

DETAILED DESCRIPTION OF THE INVENTION

[Embodiment 1]

An electric power tool according to a first embodiment of the present invention is described hereafter with reference to FIGS. 1 to 5. The electric power tool according to the embodiment is an impact driver (hereafter, referred to as an electric power tool) including a DC brushless motor (hereafter, referred to as a motor) as a drive source.

The front, rear, left, right, up, and down directions in the figures correspond to the front, rear, left, right, up, and down directions of the electric power tool.

<Housing 11 of the electric power tool>

Figure 5:
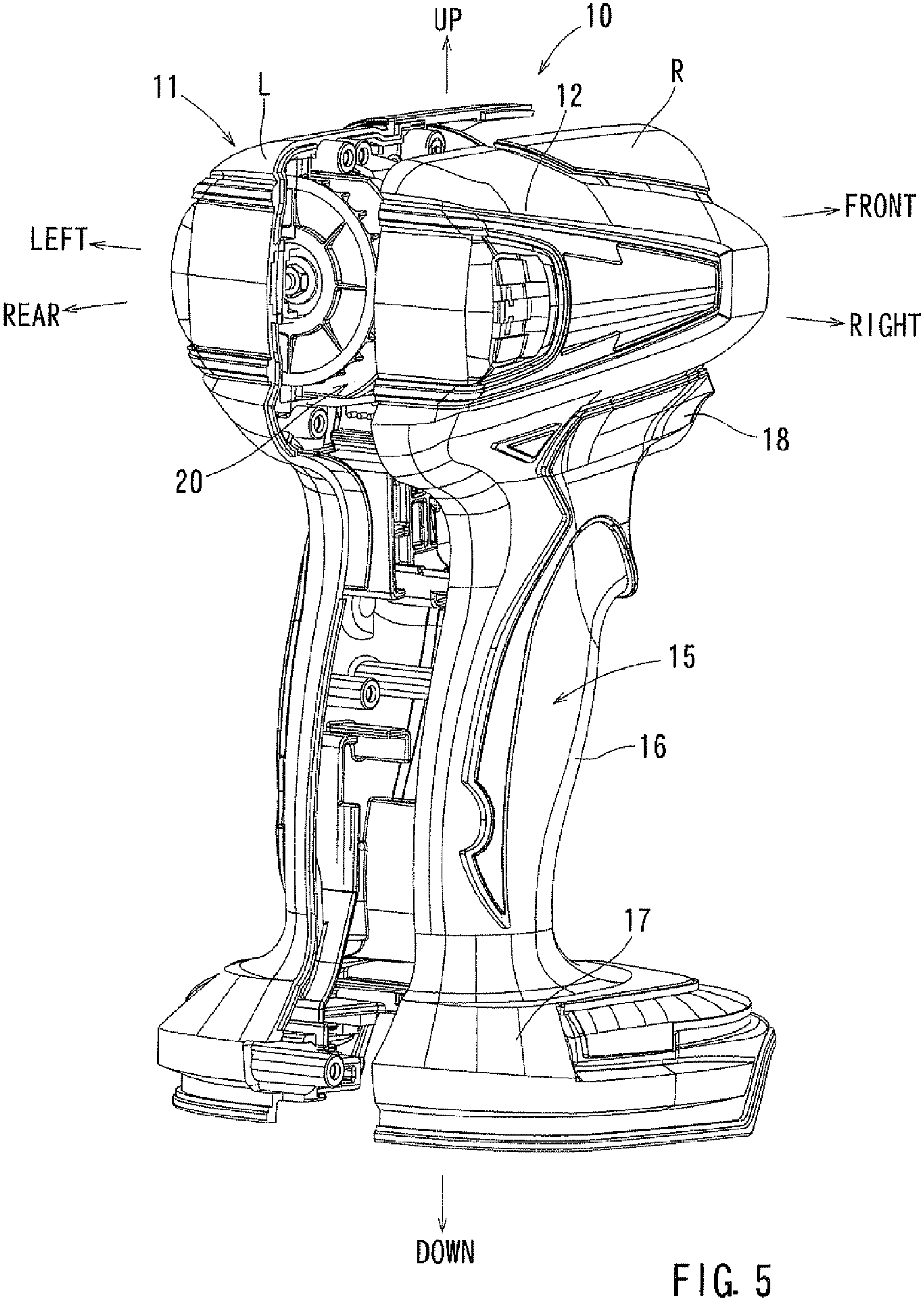
FIG. 5 is a rear perspective view showing the housing of the electric power tool.

As shown in FIG. 5, the housing 11 of an electric power tool 10 according to the embodiment is a dual-separated type housing, and the housing 11 can be assembled by combining a left housing part L with a right housing part R.

The housing 11 includes a cylindrical housing body 12 that houses a motor 20 and a grip portion 15 protruding from a side (the lower portion in FIG. 5) of the housing body 12.

The grip portion 15 is a portion that a user holds to use the electric power tool 10 and includes a holding portion 16 and a battery-retaining portion 17 positioned at the protruding end (lower end) of the holding portion 16. The holding portion 16 is relatively small in diameter to be easily held by the user, and a trigger-type main switch 18 is located at the base end of the holding portion 16. The battery-retaining portion 17 extends horizontally (mainly forward) with respect to the holding portion 16 and a battery (not shown) is connected to the lower side of the battery-retaining portion 17.

<Motor 20>

In the housing body 12, the motor 20 used as a drive source of the electric power tool 10 is housed at the rear portion of the housing body 12, and a driving mechanism (not shown) that receives a rotational force of the motor 20 and rotates a front tool (not shown) is houses at the front portion.

Figure 1:
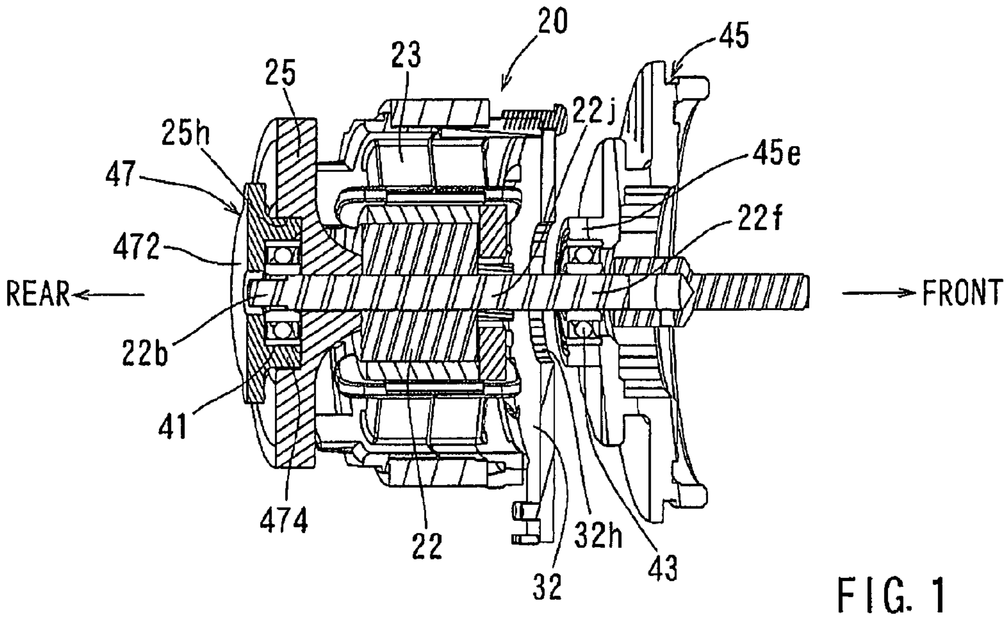
FIG. 1 is a vertical cross-sectional view of a motor of an electric power tool according to a first embodiment of the present invention.
Figure 2:
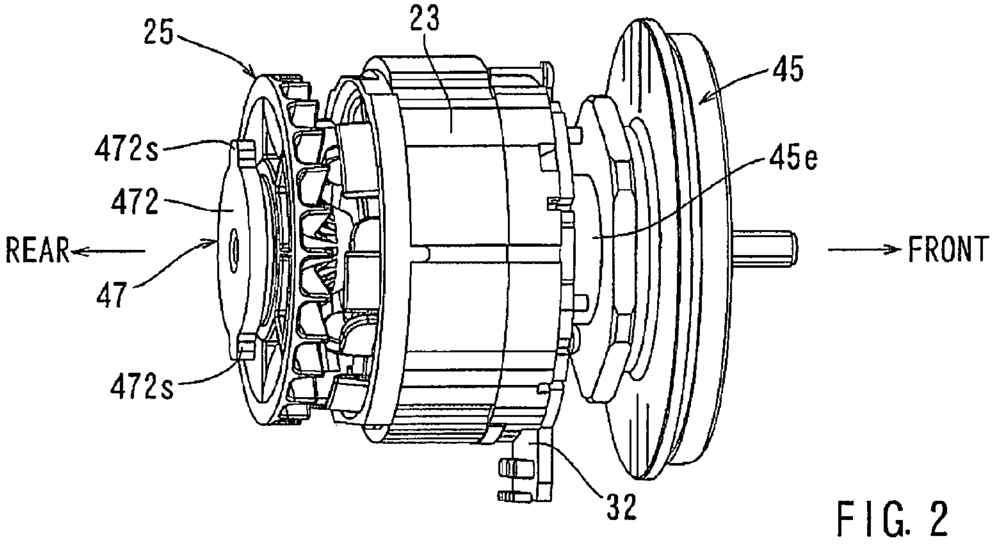
FIG. 2 is a perspective view of the motor of the electric power tool.

As shown in FIGS. 1 and 2, the motor 20 includes a rotator 22 having a permanent magnet, a stator 23 having a fixing iron core and a driving coil (not shown), a sensor substrate 32 having a magnetic sensor that detects a position of the magnetic pole of the rotator 22, and a motor cooling fan 25.

The sensor substrate 32 is formed in the form of a circular plate and coaxially located on the front surface side of the stator 23 (right end side in FIG. 1). Further, a hole 32*h* through which a rotary shaft 22*j* of the rotator 22 is placed is formed at the center of the sensor substrate 32.

The fan 25 is coaxially fixed on the rotary shaft 22*j* of the rotator 22 at the rear of the rotator 22 (left end side in FIG. 1) to integrally rotate with the rotary shaft 22*j*. Further, the rear end 22*b* of the rotary shaft 22*j* that protrudes to rearward of the fan 25 is supported by a rear bearing 41. Further, a front end 22*f* of the rotary shaft 22*j* of the rotator 22 is supported by a front bearing 43.

The front bearing 43 is supported from outside in the radial direction by a central cylindrical portion 45*e* of a front bearing support member 45 that is formed in the form of a circular plate and separates the inside of the housing body 12 in a horizontal direction.

Figure 3:
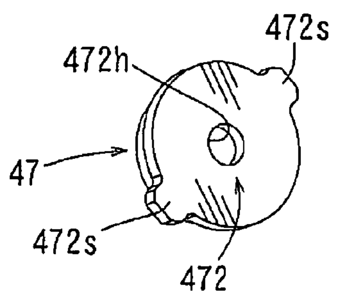
FIGS. 3A and 3B are perspective views of a rear bearing support member used in the electric power tool.
Figure 3:
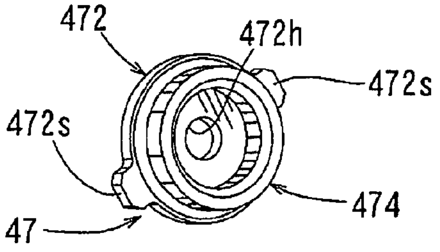
Figure 4:
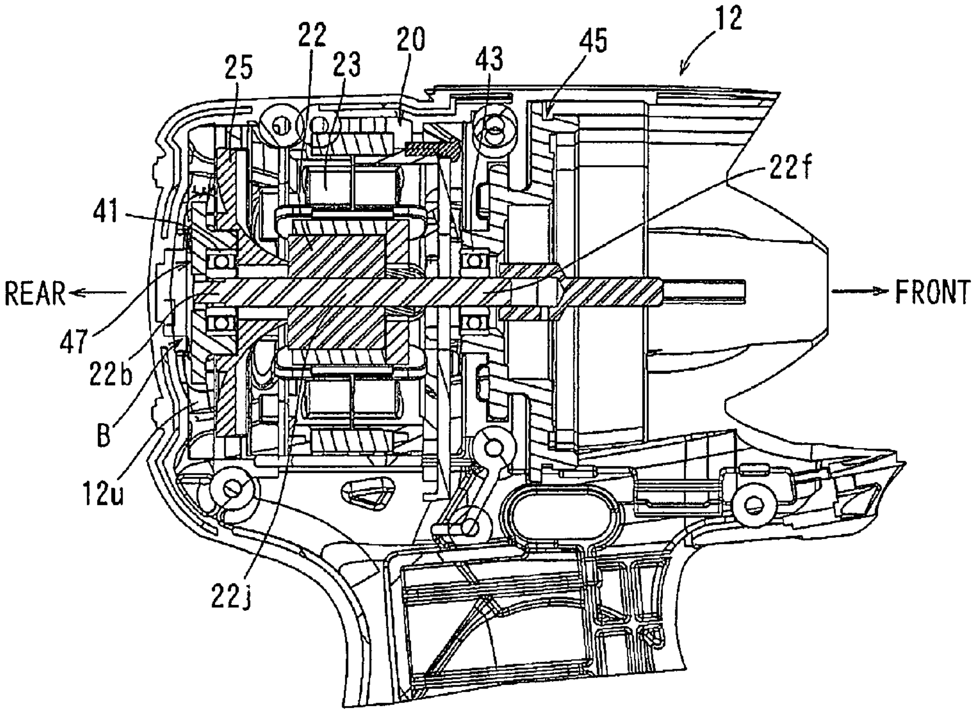
FIG. 4A is a vertical cross-sectional view of a housing body of the electric power tool.
FIG. 4B is an enlarged view of a portion B in FIG. 4A.
FIG. 4C is a view of the receiving portions.
Figure 4:
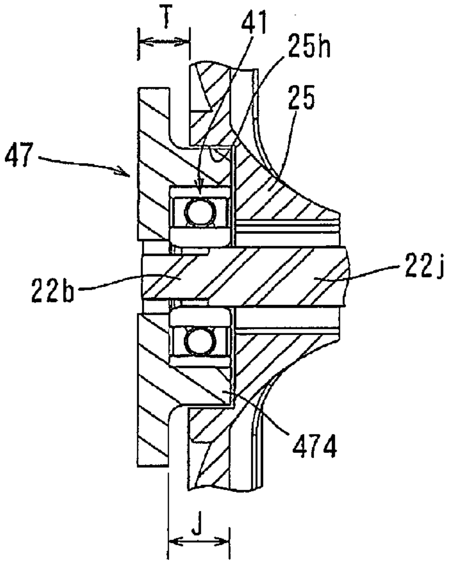
Figure 4:
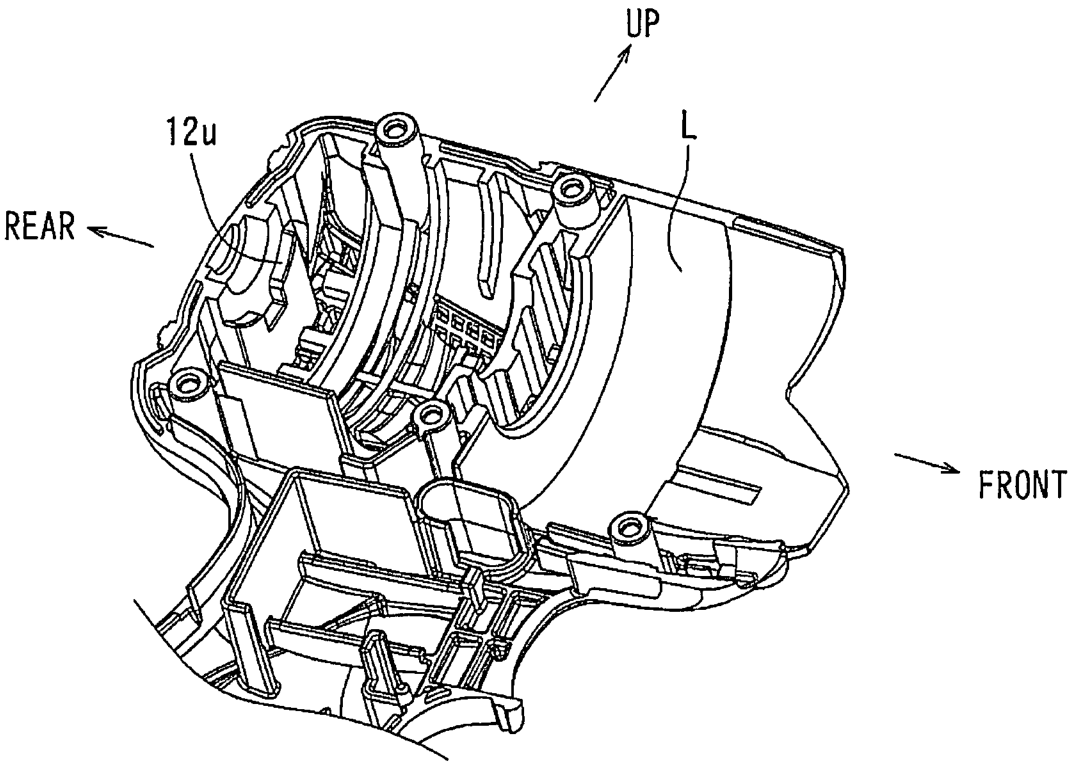

The rear bearing 41 is supported from outside in the radial direction by a rear bearing support member 47. As shown in FIGS. 1 to 3, the rear bearing support member 47 includes a circular plate portion 472 and a cylindrical portion 474 coaxially formed on the front surface of the circular plate portion 472.

As described below, the circular plate portion 472 of the rear bearing support member 47 is fixed to the housing body 12 and has a through-hole 472*h* at the center portion through which the rear end of the rotary shaft 22*j* of the rotator 22 is inserted. Further, protrusions 472*s* that protrude outward in the radial direction are formed on the outer circumferential surface of the circular plate portion 472 facing each other across the center portion, and the protrusions 472*s* prevents the rear bearing support member 47 from rotating with respect to the housing body 12.

The cylindrical portion 474 of the rear bearing support member 47 is a portion for housing the rear bearing 41, and the inner diameter of the cylindrical portion 474 is sized to press-fit the rear bearing 41. Further, the outer diameter of the cylindrical portion 474 is sized such that the cylindrical portion 474 can be axially inserted in a circular recession 25*h* formed at the center of the rear surface of the fan 25, as shown in FIG. 1.

A predetermined clearance is provided between the outer circumferential surface of the cylindrical portion 474 of the rear bearing support member 47 and the inner circumferential surface of the circular recession 25*h* of the fan 25 such that the fan 25 can rotate with respect to the cylindrical portion 474, as shown in FIG. 4B.

The axial length of the cylindrical portion 474 of the rear bearing support member 47 is sized to be substantially the same as that of the rear bearing 41. Therefore, the rear bearing 41 can be inserted entirely in the cylindrical portion 474 of the rear bearing support member 47. That is, the cylindrical portion 474 of the rear bearing support member 47 covers the entire surface of the outer circumferential surface of the rear bearing 41.

Further, as shown in FIG. 4B, the depth of the circular recession 25h of the fan 25 in the axial direction is sized such that about 80% or more of each of the cylindrical portion 474 of the rear bearing support member 47 and the rear bearing 41 can be inserted. Further, the protrusion length T of the rear bearing support member 47 that protrudes rearward from the fan 25 is sized to be sufficiently smaller than the axial lengths J of the rear bearing 41 and the cylindrical portion 474.

Further, as shown in FIG. 4A, the protruding portion of the rear bearing support member 47 which protrudes rearward from the fan 25, that is, a part of the circular plate portion 472 is held and supported from the right and left side by receiving portions 12*u* (see FIG. 4C) formed at the left housing part L and the right housing part R.

The rear bearing 41 corresponds to a bearing of the present invention and the rear bearing support member 47 corresponds to a bearing support member of the present invention. Further, the circular plate portion 472 of the rear bearing support member 47 corresponds to a protrusion of the present invention and the fan 25 corresponds to a tool component of the present invention.

<Advantages Of The Electric Power Tool 10 According To The Embodiment>

According to the electric power tool 10 of the embodiment, the rear bearing 41 and one end (front end) of the rear bearing support member 47 of the motor 20 in the axial direction are at least partially inserted in the circular recession 25*h* of the fan 15 disposed coaxially. That is, the rear bearing 41 of the motor 20 and the fan 25 partially and axially (longitudinally) overlap with each other. Therefore, as compared with the configuration of the prior art in which the rear bearing 41 of the motor 20 protrudes from the fan 25 completely and the rear bearing 41 is supported by the receiving portions 12*u* of the left and right housing parts L and R, it is possible to decrease the length of the electric power tool 10 by an amount substantially equal to the overlapping area of the rear bearing 41 and the fan 25.

The axial length T that equals to the length of the circular plate portion 472 added by the length of a part of the cylindrical portion 474 of the rear bearing support member 47 that protrudes from the fan 25 in the axial direction is sized to be sufficiently smaller than the axis length J of the rear bearing 41.

Further, the rear bearing 41 of the motor 20 is supported from outside in the radial direction by the rear bearing support member 47, with the outer circumferential surface of the rear bearing 41 completely covered by the rear bearing support member 47. Further, the protruding portion (circular plate portion 472) of the rear bearing support member 47 that protrudes rearward from the fan 25 is configured to be supported from outside in the radial direction by the receiving portions 12*u* of the pair of housing parts L and R. As described above, though the rear bearing 41 of the motor 20 partially overlaps the fan 25, the rear bearing 41 is entirely supported by the rear bearing support member 47, so that the support strength of the rear bearing 41 of the motor 20 is not reduced.

Further, since the protrusion 472*s* is formed in the circular plate portion 472 of the rear bearing support member 47, it is possible to prevent the rear bearing support member 47 from rotating with respect to the housing 11.

[Embodiment 2]

Figure 6:
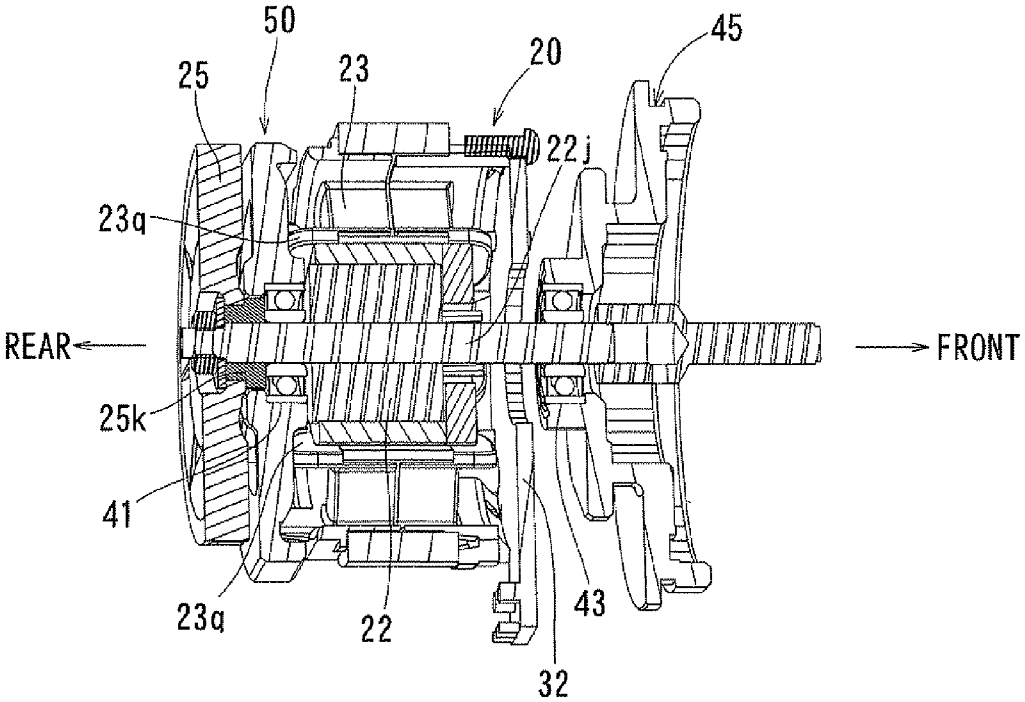
FIG. 6 is a vertical cross-sectional view of a motor of an electric power tool according to a second embodiment of the present invention.
Figure 7:
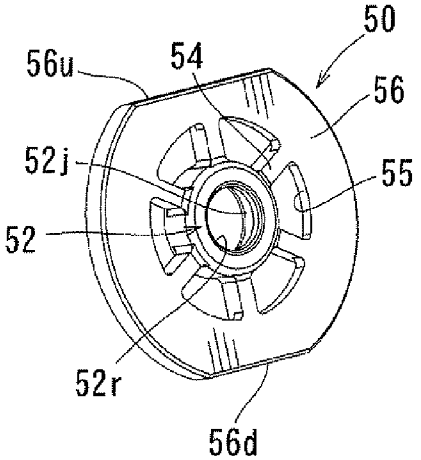
FIGS. 7A and 7B are perspective views of a baffle plate used in the electric power tool.
Figure 7:
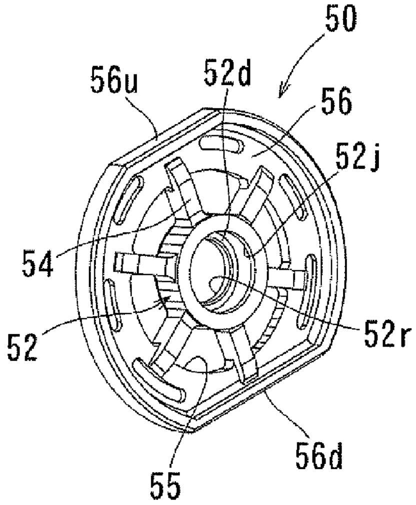
Figure 8:
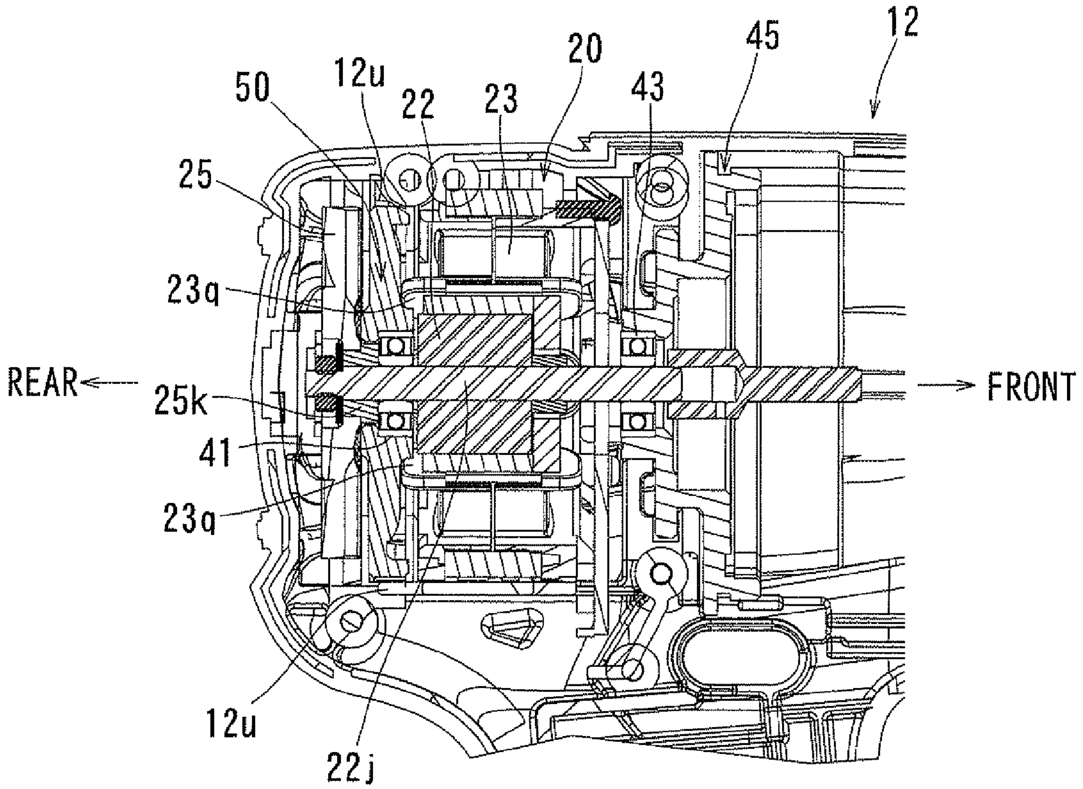
FIG. 8 is a vertical cross-sectional view of the housing body of the electric power tool.
Figure 9:
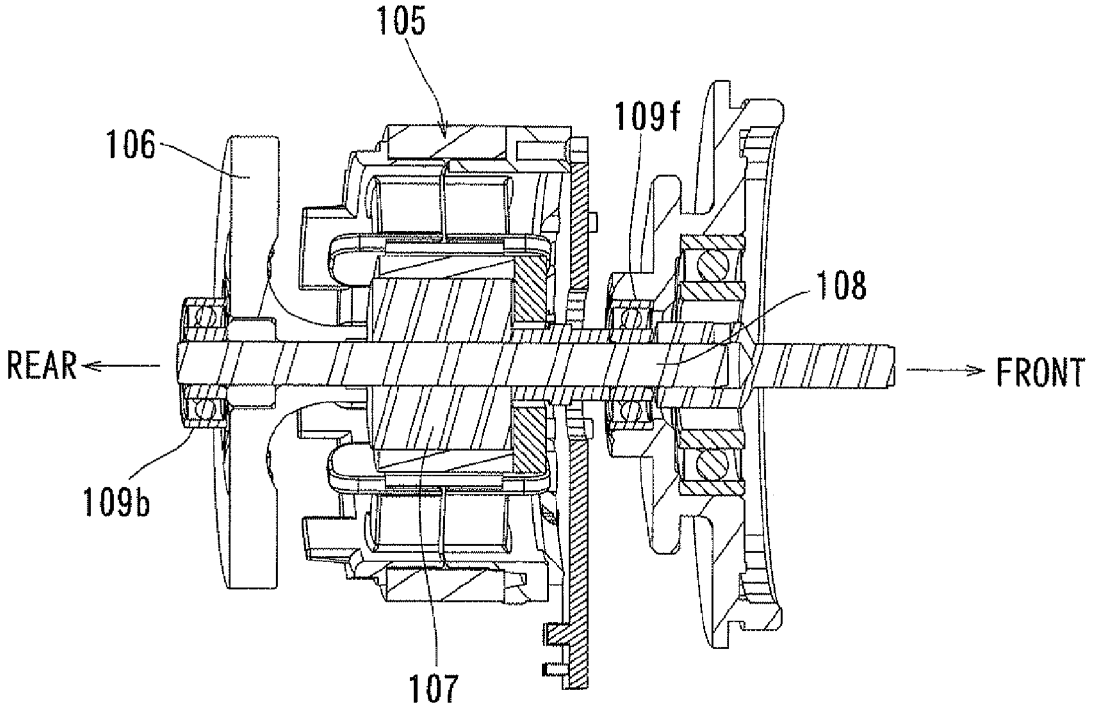
FIG. 9 PRIOR ART
FIG. 9 is a vertical cross-sectional view of a motor of an electric power tool of a prior art.

An electric power tool according to a second embodiment of the present invention is described hereafter with reference to FIGS. 6 to 8. An electric power tool according to the second embodiment can be obtained by modifying the supporting structure of the rear bearing 41 of the electric power tool 10 in the first embodiment, and the other configurations are the same as those of the electric power tool 10 in the first embodiment. Therefore, the same members as those of the electric power tool 10 in the first embodiment are given the same reference numerals and the explanation about those numbers is not provided.

In the electric power tool according to the second embodiment, a rear bearing 41 is mounted at the center portion of a baffle plate 50 in the form of a circular plate, as shown in FIGS. 6 and 7. The baffle plate 50 is for bring a wind generated by a fan 25 to the center of a motor 20 and is positioned between a stator 23 and the fan 25.

The baffle plate 50 includes a cylindrical portion 52 provided at a center portion, a plurality of frame portions 54 (six in case of FIG. 7) radially formed on the outer circumferential surface of the cylindrical portion 52, and a ring-shaped flat plate portion 56 circumferentially connecting the outward ends (outer circumferential ends) of the frame portions 54. Further, a plurality of substantially fan-shaped openings 55 (six in case of FIG. 7) is formed around the cylindrical portion 52 of the baffle plate 50, by the outer circumferential surface of the cylindrical portion 52, the pair of frame portions 54, and the inner circumferential surface of the ring-shaped flat plate portion 56. A wind from the fan 25 passes through the openings 55 and is brought to the center of the motor 20.

A bearing press-fitting hole 52*j* where the rear baring 41 is press-fitted is formed at the front portion of the cylindrical portion 52 of the baffle plate 50 and a ring insertion hole 52*r* where a fan-fixing ring 25*k* is inserted is formed at the rear portion of the cylindrical portion 52. The bearing press-fitting hole 52*j* and the ring insertion hole 52*r* of the cylindrical portion 52 are coaxially formed, and the bearing press-fitting hole 52*j* is configured to be larger than the ring insertion hole 52*r* in diameter. Further, a ring-shaped step 52*d* is formed between the bearing press-fitting hole 52*j* and the ring insertion hole 52*r*. Accordingly, the rear bearing 41 is press-fitted in the bearing press-fitting hole 52*j* of the cylindrical portion 52 to come in contact with the step 52*d*. The axial length of the bearing press-fitting hole 52*j* of the cylindrical portion 52 is sized to be the same as that of the rear bearing 41. Therefore, the rear bearing 41 can be housed completely in the bearing press-fitting hole 52*j* of the cylindrical portion 52.

The fan-fixing ring 25*k* is inserted in the ring insertion hole 52*r* of the cylindrical portion 52 of the baffle plate 50 such that the fan-fixing ring 25*k* rotates relatively with respect to the baffle plate 50. The fan-fixing ring 25*k* is fixed on a rotary shaft 22*j* to rotate integrally with the rotary shaft 22*j* of the motor 20. Further, the fan 25 is mounted to the fan-fixing ring 25*k* to rotate integrally with the rotary shaft 22*j*.

Further, as shown in FIG. 7, an upper cut plane 56*u* and a lower cut plane 56*d* for preventing the baffle plate 50 from rotating with respect to the housing body 12 are formed on the upper surface and the lower surface of the outer circumferential surface of the ring-shaped flat plate portion 56 of the baffle plate 50. As shown in FIG. 8, the outer circumferential surface of the baffle plate 50 is held and supported from the right and left side by the receiving portions 12*u* formed at a left housing part L and a right housing part R of the housing 11.

In this state, a part of an insulator 23*q*, which covers the teeth (not shown) of a fixing iron core of the stator 23, axially (horizontally) and partially overlaps the cylindrical portion 52 of the baffle plate 50 and the rear bearing 41, as shown in FIGS. 6 and 8.

In this embodiment, the baffle plate 50 corresponds to the bearing support member of the present invention, and the insulator 23*q* and the fixing iron core correspond to the tool components of the present invention.

<Advantage Of The Electric Power Tool According To The Embodiment>

According to the electric power tool of the embodiment, since the bearing support member can be obtained by using the baffle plate 50 that brings the wind generated by the fan 25 to the center of the motor 20, it is not necessary to provide a separate member only for supporting the bearing of the motor 20. Therefore, it is possible both to reduce the cost and to decrease the axial (horizontal) length of the motor 20.

<Modification Example>

The present invention is not limited to the embodiments described above and may be modified without departing from the scope of the present invention. The first and second embodiments exemplify that the present invention is applied to the rear bearing 41 and the rear bearing support member 47. However, for example, the present invention may be applied to the front bearing 43 and the front bearing support member 45.

Further, although the first and second embodiments exemplify that the DC brushless motor 20 is used in the electric power tool 10 as a drive source. However, the present invention may be applied to an electric power tool including a general DC motor or AC motor, which has a brush, as a drive source.

EXPLANATION OF SYMBOLS

11 . . . housing
12 . . . housing body
12*u* . . . receiving portion
20 . . . motor
23 . . . stator (tool component)
23*q* . . . insulator (tool component)
25 . . . fan (tool component)
25*h* . . . circular recession
41 . . . rear bearing (bearing)
47 . . . rear bearing support member (bearing support member)
472 . . . circular plate portion (protruding portion)
472*s* . . . protrusion (baffle)
50 . . . baffle plate (bearing support member)
56*u* . . . upper cut plane (baffle)
56*d* . . . lower cut plane (baffle)
L . . . left housing part
R . . . right housing part

The invention claimed is:

1. An electric power tool configured such that a motor used as a drive source is housed in a dual-separated type housing, comprising:

a bearing support member that covers an outer circumferential surface of a bearing of the motor and supports the bearing from outside in the radial direction;

wherein the bearing and one end of the bearing support member in the axial direction are at least partially inserted in a tool component disposed coaxially;

wherein a protruding portion that is the other end of the bearing support member and axially protrudes from the tool component is supported by receiving portions of a pair of housing parts;

wherein a baffle for the housing is formed at the protruding portion of the bearing support member and the baffle extends from the bearing support member; and wherein an axial length of the protruding portion of the bearing support member is smaller than that of the bearing of the motor.

2. The electric power tool according to claim 1, wherein the tool component is a fan fixed on a rotary shaft of the motor, a fixing iron core of the motor, or an insulator that covers teeth of the fixing iron core.

3. An electric power tool configured such that a motor used as a drive source is housed in a dual-separated type housing, comprising:

a bearing support member that covers an outer circumferential surface of a bearing of the motor and supports the bearing from outside in the radial direction;

wherein the bearing support member is disposed between a fan fixed on a rotary shaft of the motor and a fixing iron core of the motor;

wherein an outer circumferential edge of the bearing support member is supported by receiving portions of a pair of housing parts; and wherein a plane for preventing the bearing support member from rotating with respect to the housing is formed on the outer circumferential surface of the bearing support member.

4. The electric power tool according to claim 3, wherein the bearing support member has an opening at a center portion thereof and brings a wind generated by the fan at the time of the rotation of the motor to the center portion.

* * * * *